United States Patent
Argersinger

(10) Patent No.: US 10,458,575 B2
(45) Date of Patent: Oct. 29, 2019

(54) FLEXIBLE PIPE LOOP

(71) Applicant: Flex-Hose Co., Inc., East Syracuse, NY (US)

(72) Inventor: Philip B. Argersinger, Santa Rosa Beach, FL (US)

(73) Assignee: Flex-Hose Co., Inc., East Syracuse, NY (US)

(*) Notice: Subject to any disclaimer, the term of this patent is extended or adjusted under 35 U.S.C. 154(b) by 415 days.

(21) Appl. No.: 15/217,229

(22) Filed: Jul. 22, 2016

(65) Prior Publication Data

US 2018/0023730 A1 Jan. 25, 2018

(51) Int. Cl.
| | |
|---|---|
| *F16L 11/12* | (2006.01) |
| *F16L 11/00* | (2006.01) |
| *F16L 11/115* | (2006.01) |
| *F16L 43/00* | (2006.01) |
| *F16L 27/08* | (2006.01) |
| *F16L 51/04* | (2006.01) |

(52) U.S. Cl.
CPC ............ *F16L 11/12* (2013.01); *F16L 11/115* (2013.01); *F16L 27/0861* (2013.01); *F16L 43/00* (2013.01); *F16L 51/04* (2013.01); *F16L 11/00* (2013.01)

(58) Field of Classification Search
CPC ...... F16L 11/115; F16L 27/0861; F16L 43/00; F16L 51/04; F16L 11/00; F16L 11/15; F16L 11/12
USPC ............. 285/179, 179.1, 222.3, 14; 138/177, 138/DIG. 11
See application file for complete search history.

(56) References Cited

U.S. PATENT DOCUMENTS

| | | | | |
|---|---|---|---|---|
| 700,378 | A * | 5/1902 | Schmidt | F16L 5/00 285/114 |
| 1,593,268 | A * | 7/1926 | Montague | F16L 27/0865 285/148.3 |
| 3,847,184 | A * | 11/1974 | God | F16L 11/15 138/120 |
| 5,195,784 | A * | 3/1993 | Richter | F16L 51/04 248/55 |
| 5,803,506 | A * | 9/1998 | Argersinger | F16L 51/04 285/14 |
| 6,024,134 | A * | 2/2000 | Akedo | F16L 11/115 138/122 |
| 6,227,578 | B1 * | 5/2001 | Fukui | F16L 11/15 285/179 |
| 2005/0178438 | A1 * | 8/2005 | Renner | F16L 55/24 137/247.41 |

(Continued)

OTHER PUBLICATIONS

Communication from the Canadian Patent Office dated May 31, 2018.

*Primary Examiner* — Anna M Momper
*Assistant Examiner* — William S. Choi
(74) *Attorney, Agent, or Firm* — Bond Schoeneck & King, PLLC; George McGuire

(57) ABSTRACT

A flexible pipe loop including three flexible tube members: a first flexible tube member connected to a pipe run, a second flexible tube member connected to the first tube member, and a third flexible tube member connected to the second flexible tube member, the second flexible tube member and the third flexible tube member arranged such that they are substantially parallel. The configuration of the three flexible tube members permits six degrees of freedom of the flexible pipe loop.

12 Claims, 2 Drawing Sheets

(56) References Cited

U.S. PATENT DOCUMENTS

| | | | | |
|---|---|---|---|---|
| 2006/0061092 A1* | 3/2006 | Keyes | ................... | F16L 51/025 |
| | | | | 285/226 |
| 2009/0194992 A1* | 8/2009 | Bochenek | ............... | F16L 3/015 |
| | | | | 285/61 |
| 2009/0224533 A1* | 9/2009 | Richter | ................... | F16L 3/133 |
| | | | | 285/61 |

* cited by examiner

FLEXIBLE PIPE LOOP

FIELD OF THE APPLICATION

The present invention relates to flexible pipe and more specifically to a flexible pipe loop providing six degrees of freedom.

BACKGROUND

Over time, buildings are subjected to variety of external forces that cause stress on the building's piping system. For example, thermal expansion and contraction, random seismic shifts, and offset or misalignment of the apparatus to which pipes are connected can cause the pipes to leak or break apart. Such breakages can cause large amounts of damage to the structure of the building and expose building occupants to a variety of hazards, such as toxic or hot gases.

To remedy this problem, a variety of solutions have been proposed—each adding a flexible pipe structure at a divided section of the pipe run. However, each proposed solution is (1) limited in the range of motion and flex or (2) takes up a large amount of space. For example, some solutions only provide flexibility in the X, Y, and Z directions. This fails to accommodate rotational movement of the pipe run, and therefore does not relieve all the stresses on piping system.

Accordingly, there is a need in the art for a flexible pipe loop which permits six degrees of freedom to accommodate each of the potential stresses placed on the piping system and which consumes minimal space.

SUMMARY

Therefore, this disclosure is directed to a flexible pipe loop which permits six degrees of freedom and consumes minimal space. According to an embodiment, the flexible pipe loop includes a first flexible tube that is connected to a pair of parallel flexible pipe loops. The first flexible tube member, in an embodiment, is substantially perpendicular to the parallel flexible pipe loops. This configuration allows six degrees of freedom and only requires three flexible pipes.

According to an aspect, a flexible pipe loop for use in a pipe run, which is divided at allocation along its run, comprises: a first flexible tube member comprising a first and second open end, wherein the first open end is to be connected to the pipe run at the divided location such that the first flexible tube member is in fluid communication with the pipe run; a second flexible tube member comprising a first and second open end, wherein the first open end is connected to and in fluid communication with the second open end of the first flexible tube member; a third flexible tube member comprising a first and second open end, wherein the first open end is connected to and in fluid communication with the second open end of the second flexible tube member such that the third flexible tube member is disposed substantially in parallel with the second flexible tube member, wherein the second open end of the third flexible tube member is to be connected to and in fluid communication with the pipe run; wherein the first flexible tube member is disposed substantially perpendicularly to both the second flexible tube member and the third flexible tube member.

According to an embodiment, the first flexible tube member is disposed substantially in-line with the pipe run.

According to an embodiment, the second flexible tube member is connected to the first flexible tube member by a first pipe elbow.

According to an embodiment, the first pipe elbow is a 90° pipe elbow.

According to an embodiment, the third flexible tube member is connected to the second flexible tube member by a second pipe elbow.

According to an embodiment, the second pipe elbow is a 180° pipe elbow.

According to an embodiment, the third flexible tube member is to be disposed substantially perpendicular to the pipe run.

According to an embodiment, the first flexible tube member comprises a single flexible tubular section.

According to an embodiment, the second flexible tube member comprises a single flexible tubular section.

According to an embodiment, the third flexible tube member comprises a single flexible tubular section.

According to an embodiment, at least one of said elbows contains an opening over which a closure is removably secured, for selectively venting gas or draining liquid.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Figure 1:
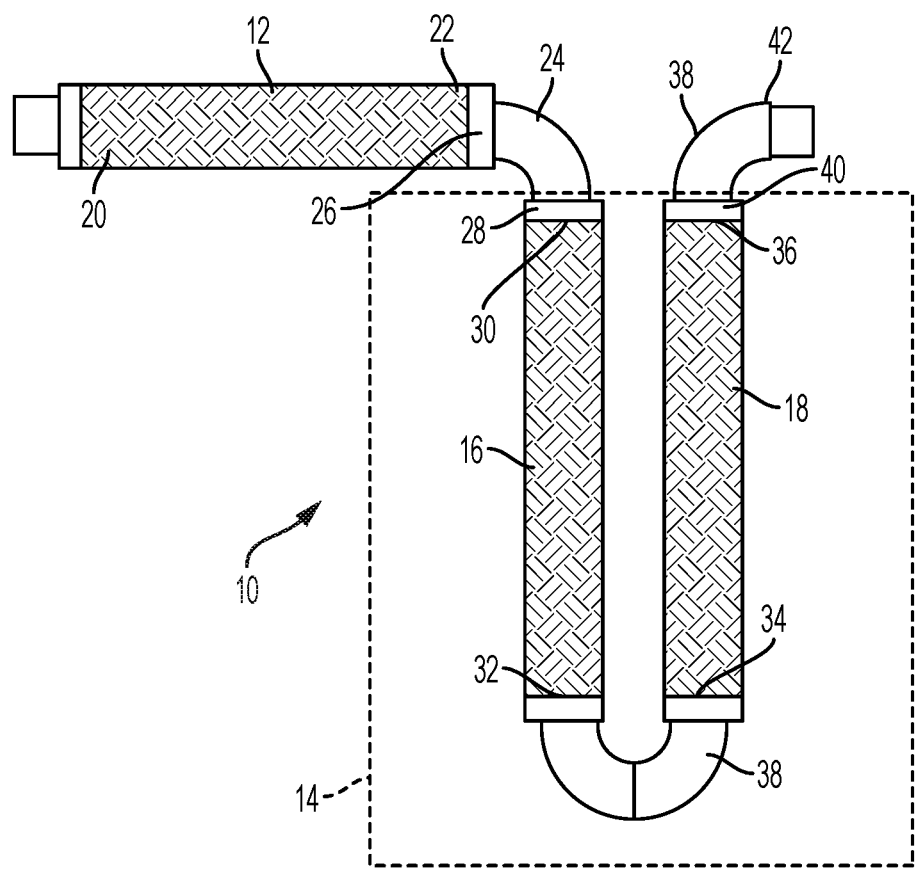
FIG. 1 elevation view of a flexible pipe loop of the present invention.

Referring now to FIG. 1, there is shown a flexible pipe loop 10 according to an embodiment. Flexible pipe loop 10 is, in an embodiment, at a location where the pipe run is divided. As shown, flexible pipe loop 10 broadly comprises two sections: (1) a first flexible tube member 12 that is connected to (2) a pair of parallel flexible tube members 14 (comprising second flexible tube member 16 and third flexible member 18) such that first flexible tube member 12 is perpendicular with flexible tube members 16, 18. This configuration permits flexible pipe loop 10 to flex with six degrees of freedom—moving freely in the x, y, and z dimensions, as well as rotationally (frequently referred to as pitch, roll, and yaw)—so that stress placed upon the pipe run may be compensated for without experiencing a breakage or other damage.

According to an embodiment, first flexible tube member 12 is comprised of flexible piping (as further described below), and includes at least two open ends: a first open end 20 and a second open end 22. The first open end 20 of first flexible tube member 12 is connected to and in fluid communication with the pipe run. The second open end 22 of first flexible tube member 12 is connected in fluid communication with parallel flexible tube members 14. First flexible tube member 12 may be connected to parallel flexible tube members 14 with a connector 24. Connector 24 may have a first end 26 and a second end 28—the first end 26 of connector 20 is connected to the second end 22 of first flexible tube member 12 and the second end 28 is connected to parallel flexible tube members 14 at the first end 30 of second flexible tube member 16.

Connector 20 may be a pipe elbow such as a 90° elbow. However, one of ordinary skill in the art will appreciate, in conjunction with a review of this disclosure, that connector 20 may be a different-angled elbow, or other connector, that permits the parallel flexible tube members 14 to remain substantially perpendicular to the first flexible tube member 12.

According to an embodiment, first flexible tube member 12, when unstressed, is substantially in-line with the pipe run. In other words, first flexible tube member 12 forms a substantially straight line with pipe run. In an alternate embodiment, flexible tube member 12 may be connected to the pipe run via an elbow or other connector such that first flexible tube member 12 is disposed perpendicular (or oblique) to the pipe run.

According to an embodiment, and as shown in FIG. 1, parallel flexible tube members 14 are comprised of second flexible tube member 16 and third flexible tube member 18. Flexible tube members 16, 18 are comprised of flexible tube piping. As shown, the second end 32 of second flexible tube 16 is connected to and in fluid communication with the first end 34 of the third flexible tube 18. In an embodiment, second flexible tube 16 is connected to third flexible tube 18 via connector 38, such that they are disposed substantially parallel to one another. In an embodiment, connector 38 may be a 180° elbow; however, other angles or connectors may be used that allow flexible tube members 16, 18 to remain substantially parallel. Second flexible tube member 16 and third flexible tube member 18 are thus substantially in parallel and are in fluid communication to form a single fluid path.

In an alternate embodiment, second flexible tube member 16 and third flexible tube member 18 may not be directly connected to one another, but may be connected instead to intervening flexible tube (not shown). In this embodiment, flexible tube members 16 and 18 may each be connected to the intervening flexible tube by means of elbows (e.g., a 90° elbow), such that flexible tube members 16 and 18 remain in parallel and the intervening flexible tube member provides a connection between flexible tube members 16 and 18.

As described earlier, parallel flexible tube members 14 are connected to first flexible tube member 12 with connector 24. At the other end, parallel flexible tube members 14 are connected to the pipe run (not shown) with connector 38. Connector 38 may include a first open end 40 and a second open end 42. As shown in FIG. 1, the first open end 40 of connector 38 may be connected to the second open end 36 of second flexible tube member 18. The second open end 42 of connector 38 may be connected to the pipe run. As shown in FIG. 1, connector 38 may be an elbow, such as a 90° elbow, so that the pipe run is perpendicular to the flexible tube members 16, 18. In an alternate embodiment, connector 38 may be another angle, such that the pipe run is at an oblique angle to flexible members 16, 18. In yet another embodiment, connector 24 may be a fitting such that flexible member 18 is substantially in-line with the pipe run.

Although flexible pipe loop 10 is shown in FIG. 1 as installed in a vertical position, it may alternately be installed in a horizontal position. Loop 10 functions similarly in this position as it does in the vertical position shown in FIG. 1.

Loop 10 may be installed in a neutral condition, as shown in FIG. 1, or may be pre-extended or pre-compressed depending on the application. For example, if loop 10 is to be installed in a normally hot pipe line, it may be pre-extended. Loop 10 will then be compressed to its neutral condition, as shown in FIG. 1. Thus, in those applications where pipe movement is predictable, a pre-deflection of loop 10 will maximize the loop's compensation ability.

As used in this disclosure, the term "substantially" refers to an ideal configuration that permits a range of deviation while not departing from the function of flexible pipe loop 10: allowing six-degrees of freedom to absorb or compensate for movement in the pipe run. Thus, for example, first flexible tube member 12 need not be exactly perpendicular to second flexible tube member 16 and third flexible tube member 18, but may deviate from perpendicular so long as the flexible pipe run 10 retains six-degrees of freedom, as described in this disclosure. Similarly, the parallel flexible tube members 14 (i.e. second flexible tube member 16 and third flexible tube member 18) need not be exactly parallel, but may deviate away from each other or toward each other, as long as the six degrees of freedom is maintained. Of course, some degree of deviation is expected as the stresses on the pipe run force the flexible pipe loop 10 to assume different shapes.

In an embodiment, elbows and fittings are typically made from alloys of carbon steel, stainless steel or bronze. Other types of end fittings may be employed, including male or female pipe threads, weld nipples, swivel unions, slip-on and stub-&-lap joint flanges, sanitary fittings, flared tube fittings, grooved fittings, or other specially designed connectors, all known in the plumbing art.

Figure 2:
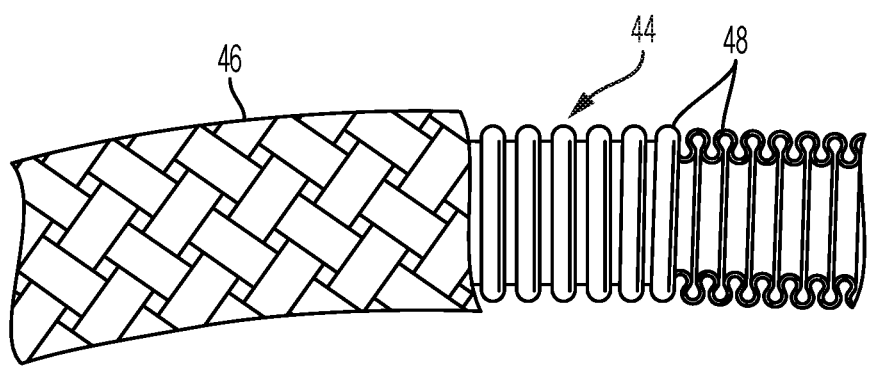
FIG. 2 shows a schematic of a device, according to an embodiment.

Referring now to FIG. 2, there is shown an embodiment of the construction of flexible tube members 12, 16, 18 (or other flexible tube members that may be used in other embodiments). Each tube member, in an embodiment, consists of a single flexible tubular section, constructed as shown in FIG. 2. An annular corrugated metal hose 44 is covered and protected by a metal braided sheath 46. Hose 44 comprises a series of integrally formed annular corrugations 48. The corrugations enable hose 44 to flex without exceeding its elastic limit. Braid 46 is a tubular sheath of metal wires woven in a "basket weave" manner. Braid 46 fits snugly over hose 44 and is fastened to the ends of the hose. Braid 46 flexes with hose 44 and prevents elongation of the hose under pressure. Braid 46 should be strong enough to withstand elongation for the full pressure rating of hose 44. In an alternative construction, hose 44 may have helical, rather than annular, corrugations. It should be noted that each flexible pipe need not be comprised a single continuous flexible unit, but may instead be segmented and include multiple flexible segments separated by rigid pieces.

Suitable metals for hose 44 and braid 46 are those having properties of high strength and high resistance to temperature and corrosion, yet having the ability to flex. Typical metals for hose 44 and braid 46 include alloys of stainless steel, or bronze. Hose 44 may also be made of Teflon covered by a metal braid, which is a construction particularly suited for chemical applications. Such metal braided corrugated hose (metal or Teflon hose) is commercially available from a number of sources including FLEXHOSE CO., INC., East Syracuse, N.Y.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A flexible pipe loop for use in a pipe run, which is divided at a location along its run, said flexible pipe loop comprising:
    a first flexible tube member comprising a first open end and a second open end, wherein the first open end of the first flexible tube member is to be connected to the pipe run at the divided location such that the first flexible tube member is in fluid communication with the pipe run;
    a second flexible tube member comprising a first open end and a second open end, wherein the first open end of the second flexible tube member is connected to and in fluid communication with the second open end of the first flexible tube member;
    a third flexible tube member comprising a first open end and a second open end, wherein the first open end of the third flexible tube member is connected to and in fluid communication with the second open end of the second flexible tube member such that the third flexible tube member is disposed substantially in parallel with the second flexible tube member, wherein the second open end of the third flexible tube member is to be connected to and in fluid communication with the pipe run;
    wherein the second flexible tube member is connected between the first flexible tube member and third flexible tube member such that fluid received from the pipe run at the divided location sequentially flows through the first flexible tube member, the second flexible tube member, and the third flexible tube member, in order, wherein the first flexible tube member is disposed substantially perpendicularly to both the second flexible tube member and the third flexible tube member, wherein the flexing of the first flexible tube member, the second flexible tube member, and the third flexible tube member, in combination, provides the flexible pipe loop six degrees of movement across the flexible pipe loop.

2. The flexible pipe loop of claim 1, wherein the first flexible tube member is disposed substantially in-line with the pipe run.

3. The flexible pipe loop of claim 1, wherein the second flexible tube member is connected to the first flexible tube member by a first pipe elbow.

4. The flexible pipe loop of claim 3, wherein the first pipe elbow is a 90° pipe elbow.

5. The flexible pipe loop of claim 3, wherein the first pipe elbow contains an opening over which a closure is removably secured, for selectively venting gas or draining liquid.

6. The flexible pipe loop of claim 1, wherein the third flexible tube member is connected to the second flexible tube member by a second pipe elbow.

7. The flexible pipe loop of claim 6, wherein the second pipe elbow is a 180° pipe elbow.

8. The flexible pipe loop of claim 6, wherein the second pipe elbow contains an opening over which a closure is removably secured, for selectively venting gas or draining liquid.

9. The flexible pipe loop of claim 1, wherein the third flexible tube member is to be disposed substantially perpendicular to the pipe run.

10. The flexible pipe loop of claim 1, wherein the first flexible tube member comprises a single flexible tubular section.

11. The flexible pipe loop of claim 1, wherein the second flexible tube member comprises a single flexible tubular section.

12. The flexible pipe loop of claim 1, wherein the third flexible tube member comprises a single flexible tubular section.

* * * * *